Oct. 20, 1953 — P. G. WATKINS — 2,655,764
DEVICE FOR HEATING ORCHARDS
Filed Jan. 4, 1950 — 2 Sheets-Sheet 1

Inventor
Percy G. Watkins

Oct. 20, 1953   P. G. WATKINS   2,655,764
DEVICE FOR HEATING ORCHARDS
Filed Jan. 4, 1950   2 Sheets-Sheet 2

Inventor
Percy G. Watkins
By Clarence A. O'Brien
and Harvey B. Jacobson
Attorneys Patented Oct. 20, 1953

2,655,764

UNITED STATES PATENT OFFICE 2,655,764

DEVICE FOR HEATING ORCHARDS

Percy G. Watkins, Oak View, Calif.

Application January 4, 1950, Serial No. 136,668

3 Claims. (Cl. 47—2)

This invention relates to novel and useful improvements in heaters.

An object of this invention is to heat a region or area, preferably in an orchard, by drawing air through cool air inlet openings at the bottom of the stack and urging the air upward either by the natural air flow principle involved in the stack alone or by this operation together with a fan which is disposed at the top of the stack adjacent an air outlet opening so that the air heated by passage through a heating element may pass through one or more heated air outlet openings adjacent the top of the stack, the heated air being directed outwardly and downwardly toward the trees of the orchard.

Another object of this invention is to impel the air in the proper and necessary direction, that is, outwardly and downwardly toward the top parts of the trees by discharging the heated air from a position considerably above such trees.

Another object of this invention is to direct the heated air in a rather large radius by arranging an air deflector or air deflecting medium at the top of the stack for this purpose.

Ancillary objects and features of novelty will become apparent to those skilled in the art, in following the description of the illustrated form of the invention.

In the drawings:

Figure 4 is a transverse view taken substantially on the line 4—4 of Figure 2 and in the direction of the arrows;

Figure 5 is a fragmentary elevational view illustrating a second form of the invention.

Figure 1:
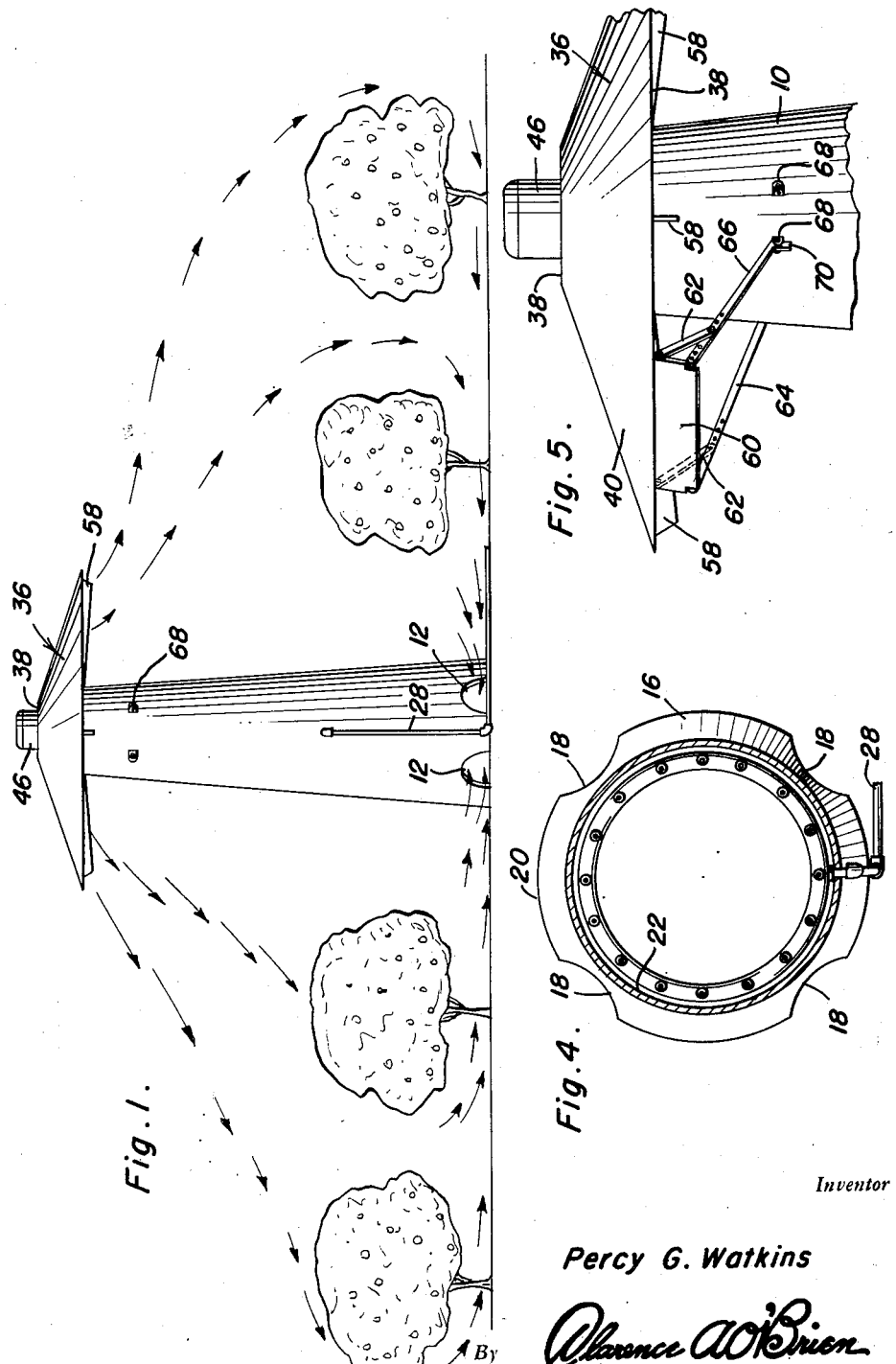
Figure 1 is an elevational view of one form of the invention, showing its use in connection with an orchard.

The present invention has for its main purpose to heat a region or area of an orchard during the frost season for the obvious purpose of preventing loss of the products of the orchard and damage to the trees of such orchard.

This end is accomplished by the employment of one or more of the illustrated embodiments of the invention or combination of essential parts thereof.

Each embodiment includes a hollow stack 10 which has air inlet openings 12 at the extreme lower end thereof adjacent the ground. The stack is preferably tubular in shape and tapers as it reaches the top in order to increase the velocity of the heated air as it travels upwardly, even though the natural reduction in pressure accompanies this result.

Reference to Figure 4 shows a circular ring 16 with smoothly curved notches 18 along the periphery thereof. The outside circle or perimeter 20 of the plate 16 engages the inside surface of the stack 10 intermediate the upper end and lower end thereof. The smoothly curved notches or openings 18 are for the purpose of air passage along the wall of the tube 10. The inside of the ring is open and there is a flange 22 projecting toward said inside. This flange seats a burner 26, either of the oil, gas or other type. The burner has a fuel inlet line 28 operatively connected therewith, which passes through the wall of the stack 10 and communicates with the interior of said burner. Ignition takes place or is initiated by any suitable means, as an access door (not shown), or by the pilot burner. While it has been considered probable that petroleum oil such as that used in the "smudge pots" for heating orchards would be used as fuel on account of the ready availability of such oil and the equipment for handling it where there are orchards that at times require some protection from freezing, slight changes in the heating element within the stack for the purpose of adapting it to the use of other fuels would be within the scope of this invention.

Figure 2:
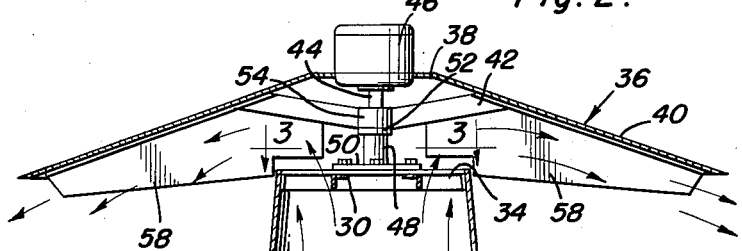
Figure 2 is a longitudinal sectional view of the device shown in Figure 1.
Figure 3:
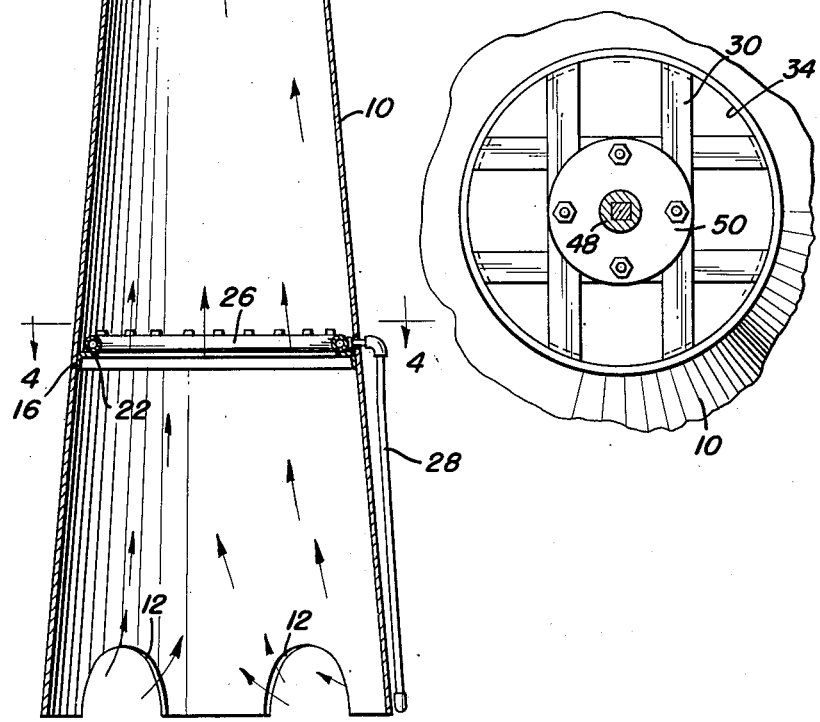
Figure 3 is a transverse view taken on the line 3—3 of Figure 2 and in the direction of the arrows.

The upper end of the stack has a webbing formed of a number of cross members 30 disposed therein. Said upper end is open, forming a heated air outlet 34. In the embodiment of the invention as seen best in Figure 2, there is a cover 36 which serves the purpose of a baffle and a rotor. The baffle is provided with a top 38 and sloping sides 40, thereby rendering it generally conical in shape, whereby the heated air extending through the stack is directed downwardly toward the trees of the orchard.

A spider 42 is fixed to the bottom surface of the cover 36 and the case of the motor is also fixed to the cover 36. A bearing 48 is secured to a plate 50, which plate is fixed to the web 30. The bearing 48 has a collar 52 at the upper end thereof, on which seats the bearing 54 of the web 42.

The armature shaft 44 of the motor 46 is fixed to the bearing 48. By this arrangement, the motor case revolves about the motor shaft as an axis causing the blades and cover to operate. A suitable switch, either manually operable or thermostatically operable, is employed to control the motor.

When the motor 46 is operated, the spider 42 is rotated therewith, thereby actuating the number of fan blades 58 which are rigidly fixed thereto. This forms a fan for drawing air through the heated air outlet opening 34 and directing it outwardly and downwardly toward the orchard trees.

Reference is now made primarily to Figure 5 where the stack 10 is illustrated together with the motor 46 and the cover 36 as well as the blades 58. This embodiment of the invention differentiates from the embodiment of Figure 1 in that additional means for directing the air downwardly or in the proper direction is provided. This additional means consists of one or more baffles arranged peripherally about the stack 10. Each baffle 60 has a pair of pitman arms 62 secured thereto. The baffle is arranged close to the outside edge 38 of the cover 36.

Arms 64 and 66 respectively are secured to ears 68 fixed to the outside surface of the stack 10. Each arm has a downturned leg or ear 70 which rests against the outside surface of the stack 10 to limit the pivotal travel thereof. A number of apertures (unnumbered) are provided in the arms 64 and 66 accommodating pins which are carried by the pitman arms 62. Accordingly, by moving the pitman arms to such position that said pins may be disposed in selected apertures, the angle of tilt of the baffles 60 may be regulated. The baffle being carried pivotally at the outer ends of the arms 64 and 66 and being supported pivotally by the pitman arms 62 permits such operation.

The baffles 60 are intended to be used when it is desired to prevent heated air from being forced beyond the area which is to be protected. This may be required where the area has a considerably greater length than width and is of particular importance in preventing heated air from being forced over land which is not owned by the person employing the invention.

Having described the invention, what is claimed as new is:

1. A device for heating orchards comprising a hollow stack with a cool air inlet at the bottom and a heated air outlet at the top, a heater intermediate the top and bottom of said stack, means disposed at the top of said stack for directing the flow of heated air from the heated air outlet, including a substantially concavo convex cover movably disposed on said stack and having edges which are laterally spaced from the stack, and baffles carried by said stack and located adjacent to the edges of said cover to deflect the heated air passing beneath said cover from said heated air outlet.

2. A device for heating orchards comprising a hollow stack with a cool air inlet at the bottom and a heated air outlet at the top, a heater intermediate the top and bottom of said stack, means disposed at the top of said stack for directing the flow of heated air from the heated air outlet, including a cover disposed on said stack and spaced from said air outlet to provide a heated air passage, with baffles adjustably secured to said stack and disposed adjacent the edges of said cover.

3. In a device for heating orchards, a vertical stack having an open and unobstructed air inlet at the lower end thereof and having an air outlet at the top thereof, a cover with means supporting the center part of said cover above said heated air outlet and connecting said cover to said stack, a device constituting a part of said means for rotating said cover, fan blades extending from the bottom surface of said cover and spaced from the upper end of said stack to draw air through said stack and said outlet, said cover being spaced from the upper end of said stack to provide a heated air passage, said blades being located in said passage, said cover sloping downwardly and outwardly from the center part thereof to deflect the heated air downwardly, and baffles having adjustable mounting means securing said baffles in said passageway and to said stack.

PERCY G. WATKINS.

References Cited in the file of this patent

UNITED STATES PATENTS

| Number | Name | Date |
|---|---|---|
| 1,357,314 | Cobb | Nov. 2, 1920 |
| 1,571,467 | Cobb | Feb. 2, 1926 |
| 1,767,670 | Huff | June 24, 1930 |
| 2,529,339 | Irvine et al. | Nov. 7, 1950 |

FOREIGN PATENTS

| Number | Country | Date |
|---|---|---|
| 62,849 | Hungary | Mar. 28, 1914 |